United States Patent [19]

Hoff

[11] Patent Number: 4,729,594
[45] Date of Patent: Mar. 8, 1988

[54] VAN CAMPER

[76] Inventor: Marie T. Hoff, 1431 Berg Dr., Dolton, Ill. 60419

[21] Appl. No.: 808,960

[22] Filed: Dec. 16, 1985

[51] Int. Cl.⁴ .............................................. B60P 3/34
[52] U.S. Cl. ..................................... 296/161; 296/164
[58] Field of Search ................ 135/88; 5/119; 296/26, 296/156, 161, 164, 165, 170, 171, 173, 175

[56] References Cited

U.S. PATENT DOCUMENTS

| | | | |
|---|---|---|---|
| 1,984,681 | 12/1934 | Jackson | 5/119 |
| 2,071,644 | 2/1937 | McBrady | 5/119 |
| 2,643,395 | 6/1953 | Stassinos | 296/26 |
| 2,815,762 | 12/1957 | Smith | 135/88 |
| 2,831,489 | 4/1958 | Weber | 135/88 |
| 2,870,774 | 1/1959 | Blosser | 135/88 |
| 3,186,419 | 6/1965 | McCarroll | 135/88 |
| 3,333,003 | 8/1967 | Smith | 296/173 |
| 3,410,598 | 11/1968 | Davis et al. | 296/176 |
| 3,463,540 | 8/1969 | Carr | 296/161 |
| 3,968,809 | 7/1976 | Beavers | 296/161 |
| 4,109,954 | 8/1978 | Wall | 135/88 |

FOREIGN PATENT DOCUMENTS 1251232  12/1960  France ................................. 296/26

Primary Examiner—Robert B. Reeves
Assistant Examiner—Carol L. Olson
Attorney, Agent, or Firm—Marshall, O'Toole, Gerstein, Murray & Bicknell

[57] ABSTRACT

A collapsible tent-camper apparatus adapted for use with and to provide a covered extension to a rear-opening van-type vehicle. The apparatus includes a fabric covering, a foldable bed platform, and a foldable and collapsible frame for supporting the fabric covering and bed platform. The apparatus further includes a compartment within the vehicle for storing the covering, platform and frame when folded and collapsed, in addition to structure which enables these components to be slideably moved into or out of the storage compartment.

12 Claims, 7 Drawing Figures

VAN CAMPER

BACKGROUND OF THE INVENTION

The present invention relates generally to collapsible tents and more particularly to a collapsible fabric covering, tent frame, bed platform and storage unit which are adapted for use with and to add space to a rear-opening van-type vehicle.

While a number of space-adding devices of this nature are disclosed in the prior art, these devices typically exhibit deficiencies which render them complicated, cumbersome, awkward to use, or incomplete in some regard for use as sleeping or standing quarters. For example, many of the devices include components which must be disassembled and separated prior to storage. This kind of device is disadvantageous because such disassembly is time consuming, and further because the user risks losing some of the components. Other devices, while not requiring disassembly, employ complicated mechanisms to facilitate expanding and collapsing the device for use and storage. Such complication adds to the expense of the device and often makes the device difficult to use. Many of the devices are not space efficient, and detract from otherwise useable cargo or passenger space in the vehicle. Still other devices are suitable as sleeping quarters, but not for standing or sitting, or vice versa. These devices are of limited utility.

SUMMARY OF THE INVENTION

The present invention is a collapsible camper broadly comprising a fabric covering, a tent frame, a bed platform and a storage compartment adapted for use with a rear-opening van-type vehicle.

The invention provides a covered extension to the rear of the vehicle which includes room for both sitting or standing space and for an off the ground bed platform.

The invention further includes telescoping and folding covering support and bed platform members, and a compartment adapted to the floor of the vehicle into which the collapsed components may be moved and kept for storage. The camper sets up or collapses down quickly and easily. When collapsed, the components are very compact such that a minimum of space in the vehicle is required to store them. Means are provided to enable the collapsed components to be easily moved to or from the storage compartment. By virtue of the compactness of the collapsed components, the storage compartment is similarly compact. The storage compartment, being located on the floor of the vehicle, is easily accessible. Further, the storage compartment includes structure which may be utilized as an additional bed platform within the vehicle.

Other features and advantages are inherent in the structure claimed and disclosed or will become apparent to those skilled in the art from the following detailed description in conjunction with the accompanying diagrammatic drawings.

DETAILED DESCRIPTION

The figures illustrate a van camper comprising generally a fabric covering 1, a collapsible frame 3, a bed platform 5, and a storage compartment 7.

Figure 1:
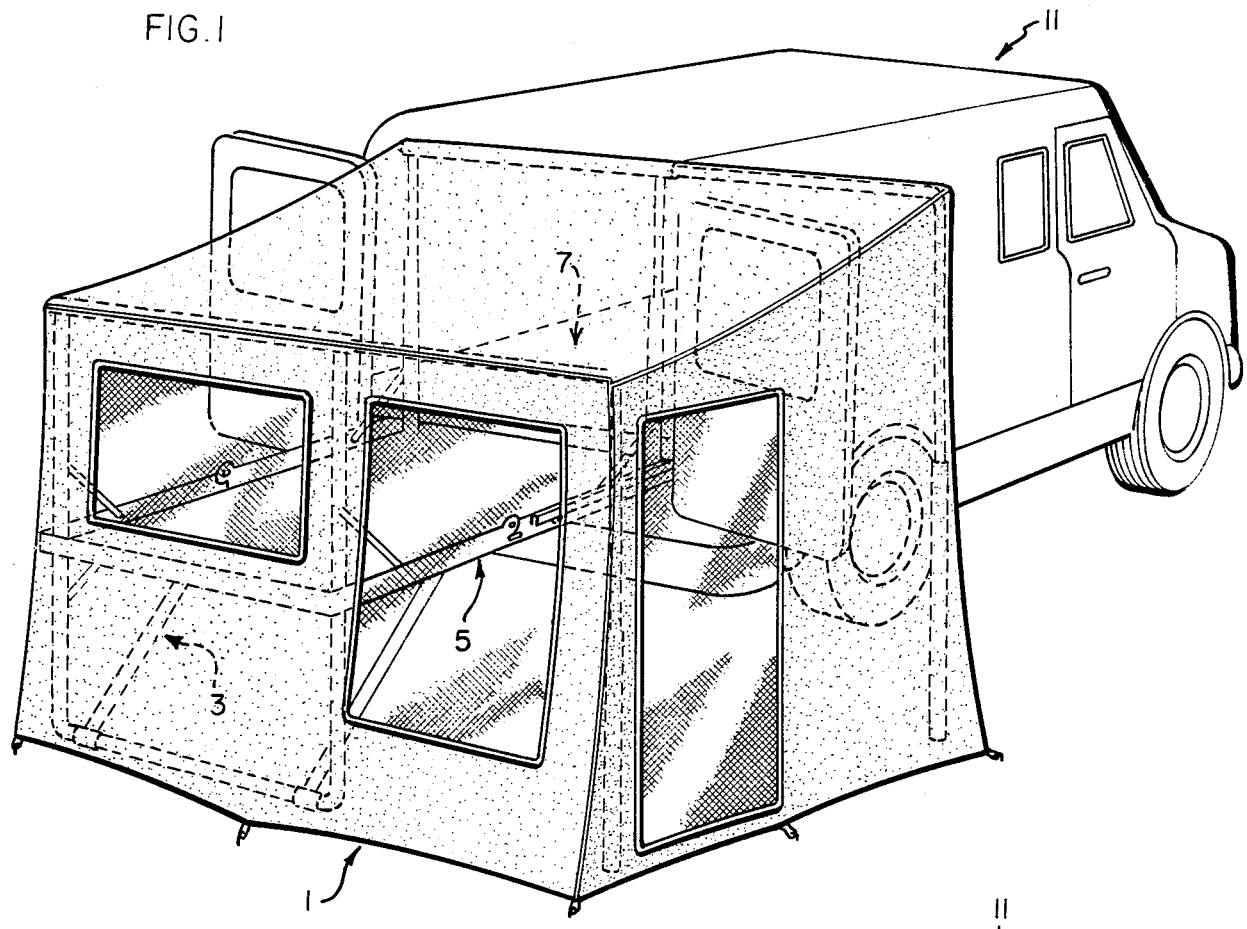
FIG. 1 is a perspective view of a camper embodying the present invention.

Referring to FIG. 1, fabric covering 1 is constructed of any suitable tenting material and is dimensioned to conform to the covering support members of frame 3 and to the periphery of the rear opening of a vehicle 11. A plurality of releasable fasteners 13 (FIG. 2) are fixed to vehicle 11 and covering 1, respectively, around the periphery of the van's rear opening for securing the covering to the vehicle adjacent the opening. Covering 1 may be provided with a door opening to allow access to the interior of the camper without the necessity of first traveling through the vehicle, and with window openings to facilitate ventilation of the camper.

Figure 2:
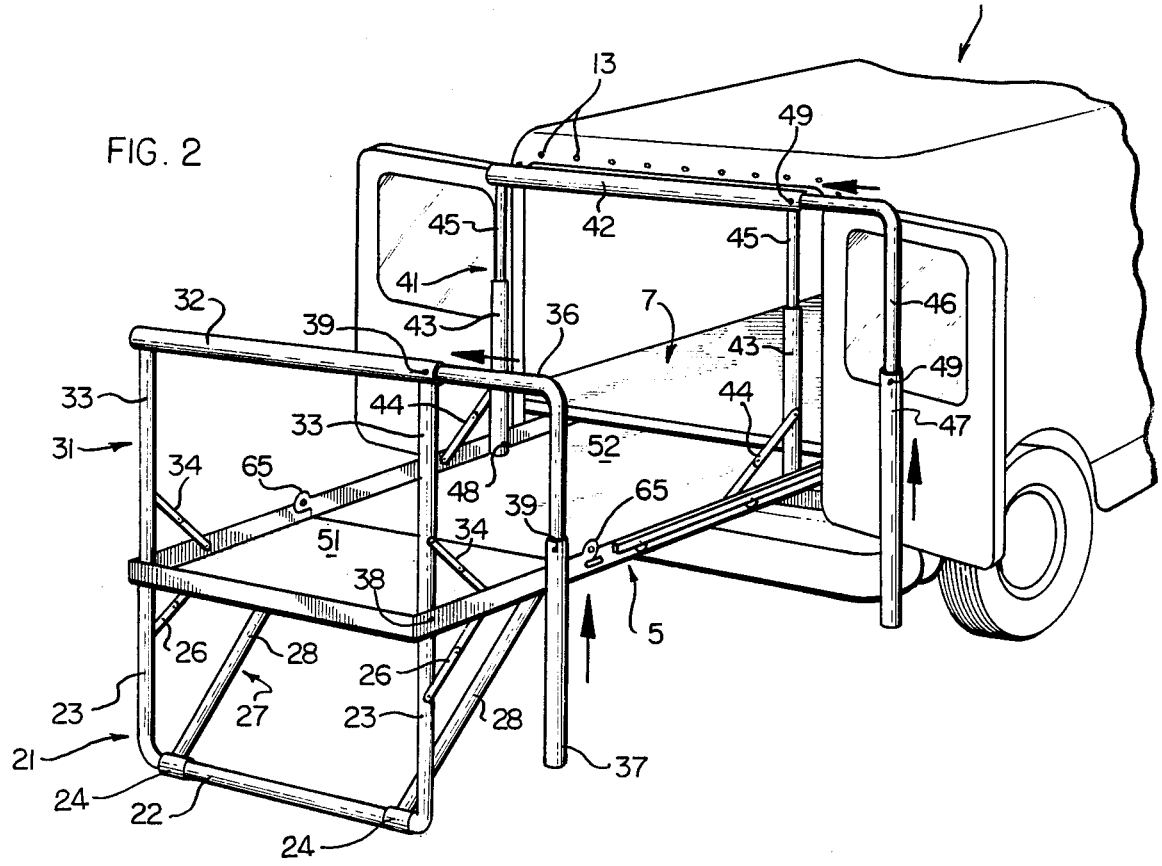
FIG. 2 is a perspective view similar to that of FIG. 1 but with certain elements of the camper removed for purposes of illustration.

FIG. 2 shows the set-up camper with covering 1 and vehicle 11 substantially removed for the purpose of illustrating frame 3 and bed platform 5.

Bed platform 5 extends above the ground rearwardly from vehicle 11. Platform 5 is dimensioned such that, when it is unfolded, it will extend substantially along the entire length of the camper beneath fabric covering 1. Platform 5 is also dimensioned such that it will extend only partially across the width of the camper, so as to leave substantial covered standing or sitting space adjacent to the platform.

Platform 5 includes a horizontal rear panel 51 and a horizontal forward panel 52, which together provide support for a bed mattress or the like (not shown). Panel 52 extends the width of platform 5 and rearwardly from the end of the platform adjacent the rear of vehicle 11. Panel 52 terminates slightly rearward of the mid-length of platform 5. Panel 51 extends the width of platform 5 and forwardly from the end of the platform farthest from the vehicle. Panel 51 terminates slightly forward of the mid-length of platform 5 where it abuts panel 52.

Panel 51 includes vertically-upwardly disposed angle portions which form the laterally opposite sides and the rearward end of the panel. In a similar fashion, panel 52 includes vertically-upwardly disposed angle portions which form the laterally opposite sides and the forward end of the panel. These angle portions add to the rigidity of panels 51 and 52 and thus to bed platform 5 as a whole. Panels 51 and 52 are joined by a pair of hinges 65 located, respectively, on the sides of the panels adjacent the abutting edges of the panels.

The forward end of panel 52 is supported above the ground by the rear of vehicle 11. As illustrated in FIG. 5, support is conveyed to panel 52 via a pair of roller wheels 61a located, respectively, adjacent laterally opposite sides of the panel and slightly rearwardly of the forward end of the panel. Roller wheels 61a rest upon a pair of guide tracks 71 (FIG. 4) attached to storage compartment 7 within the rear of vehicle 11. Specifically, each roller wheel 61a is attached to a respective downwardly-facing "U" shaped rail 58 (FIG. 3) which is in turn attached to the outer surface a respective side of panel 52, rail 58 extending along the length thereof. Roller wheels 61a are attached within rails 58 such that the bottom of the roller wheels protrude downwardly out from the open end of the "U". The lower, protruding portion of each roller wheel 61a in turn rests upon the upper surface of the respective guide track 71. Additional roller wheels 61 are spaced along the sides of panel 52 in a similar fashion to facilitate sliding the camper, when folded, into and out of storage compartment 7. Guide tracks 71 are described in detail in conjunction with the description of storage compartment 7 and FIG. 4.

Referring again to FIG. 2, the rearward end of panel 51 is supported above the ground by an upwardly-facing "U"-shaped leg member 21 having a pair of vertical leg portions 23 and a horizontal base portion 22 which is slightly less wide than the width of panel 51. The uppermost ends of legs 23 are attached, respectively, to hinge flanges 25 (FIGS. 6 and 7) which extend from the bottom surface of panel 51 slightly inwardly of the panel sides and slightly forwardly of the rearward end of the panel. Legs 23 extend vertically downward to base 22 which rests upon the ground. Member 21 is supported by a pair of foldable scissor struts 26 hingeably attached between legs 23 of member 21 and the bottom side of panel 51.

Figure 6:
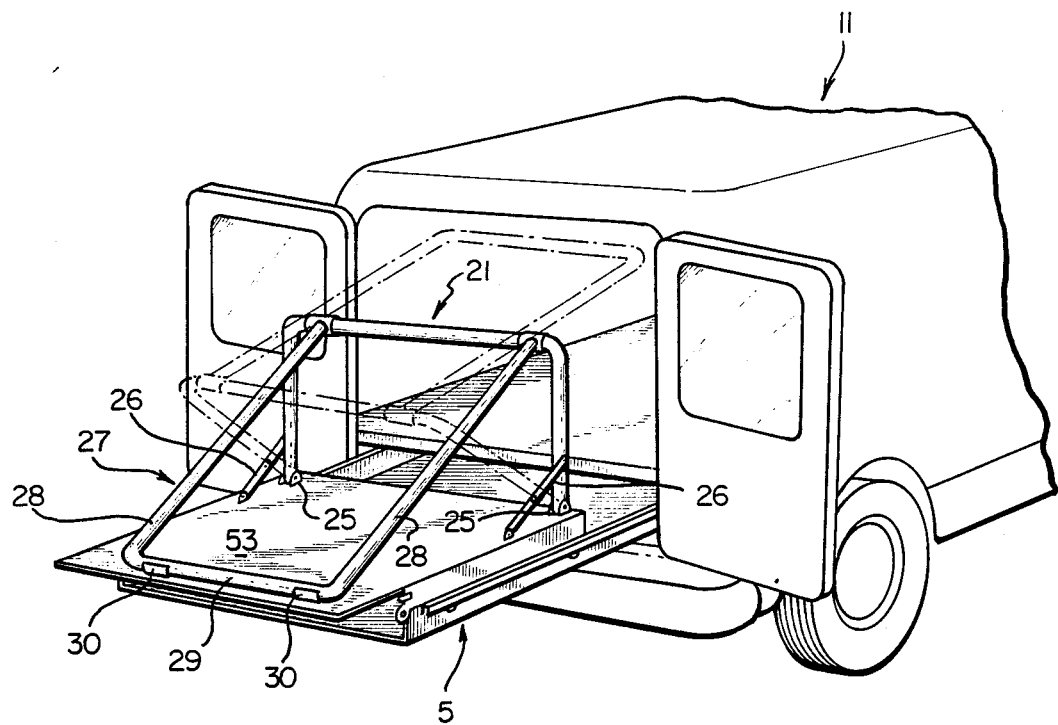
FIG. 6 is a perspective view similar to that of FIG. 5, but showing the camper in a subsequent stage of collapse prior to storage.

Bed platform 5 is supported intermediate of its forward end and rearward end by a "U"-shaped leg or strut member 27 having a pair of leg portions 28 and a horizontal base portion 29 which is slightly less wide than the width of base 22 of member 21. The lowermost ends of strut legs 28 are attached to base 22 of member 21 by a pair of hinges 24. Strut legs 28 extend up and forward toward the mid-length of platform 5 to strut base 29. As best shown in FIG. 6, strut base 29 is releasably attached to a pair of clamps 30 which are in turn fixed to the bottom of a subpanel 53. Subpanel 53 is fixed to the bottom surface of panel 51, and extends slightly rearwardly thereof to additionally underlie and support the forward portion of panel 52. Strut 27 and subpanel 53 act to prevent platform 5 from collapsing or sagging at the platform's mid-length, although subpanel 53 may not be necessary if strut 27 alone provides sufficient support.

Figure 3:
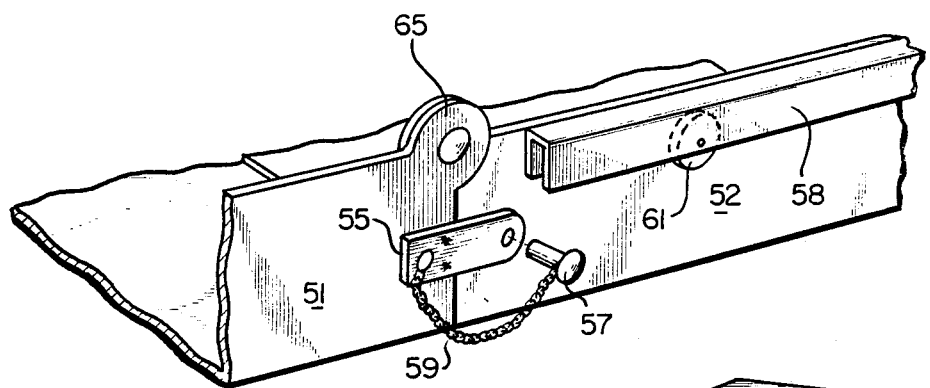
FIG. 3 is a detailed view of a portion of the camper shown in FIGS. 1 and 2.

As illustrated in FIG. 3, additional support is provided to the mid-length of platform 5 by a pair of bracket and pin assemblies located on respective sides of platform 5 adjacent the abutting edges of panel 51 and panel 52. Each such assembly includes a bracket 55 mounted to the outer surface of a respective side of panel 51 slightly rearwardly of the forward edge of the panel. Bracket 55 extends forward of panel 51 such that the forward portion of the bracket lies adjacent the associated side of panel 52. A removable pin 57 is positioned to extend laterally through a hole in the forward portion of bracket 55 and through a corresponding hole located in the side of panel 52. Pin 57 may be attached to a chain 59 to prevent loss of the pin when it is removed from the holes prior to storage of the camper. The bracket and pin assemblies help to prevent sagging at the juncture of panels 51 and 52 when the platform is loaded.

Referring again to FIG. 2, fabric covering 1 is supported at the end of the camper adjacent the rear of the vehicle by a frame portion indicated generally at 41. Frame portion 41 comprises a pair of vertical members 43 which are attached at hinges 48 to and which extend upwardly from a respective side of panel 52 slightly rearwardly of the forward end of the panel, a pair of vertical members 45 which telescope vertically from the uppermost end of a respective member 43, a horizontal cross-member 42 which is fixed to the uppermost ends of vertical members 45 and which extends across the width of panel 52, an "L"-shaped member 46 which telescopes laterally outwardly from one end of cross-member member 42 and which bends vertically downward laterally of its telescoping portion, and a vertical member 47 which telescopes from the downwardly-turned end of member 46 and which extends to rest upon the ground. Support is provided to vertical members 43 by a pair of foldable scissor struts 44 hingeably attached between a respective vertical member 43 and an associated side of panel 52. Cross-member 42 supports fabric covering 1 above panel 52, and "L"-shaped member 46 supports fabric covering 1 laterally thereof.

Fabric covering 1 is supported at the end of the camper farthest from vehicle 11 by a frame portion indicated generally at 31. Frame portion 31 comprises a pair of vertical members 33 which are attached at hinges 38 to and which extend upwardly from respective sides of panel 51 slightly forwardly of the rearward end of the panel, a horizontal cross-member 32 which is fixed to the uppermost end of each vertical member 33 and which extends across the width of panel 51, an "L"-shaped member 36 which telescopes laterally outwardly from one end of cross-member 32 and which bends vertically downward laterally of its telescoping portion, and a vertical member 37 which telescopes from the downwardly-turned end of member 36 and which extends to rest upon the ground. Support is provided to vertical members 33 by a pair of foldable scissor struts 34 hingeably attached between the respective vertical member 33 and an associated side of panel 51. Cross-member 32 supports fabric covering 1 above panel 51, and "L"-shaped member 36 supports fabric covering 1 laterally thereof.

The telescoping members of the camper, when extended, are held in position by flexible projections 39 and 49 which extend from a respective member into a corresponding hole or slot in an associated member. The projections 39 and 49 are flexible such that they may be pressed inwardly to release the associated members and to allow the members to slide into a collapsed configuration.

Figure 4:
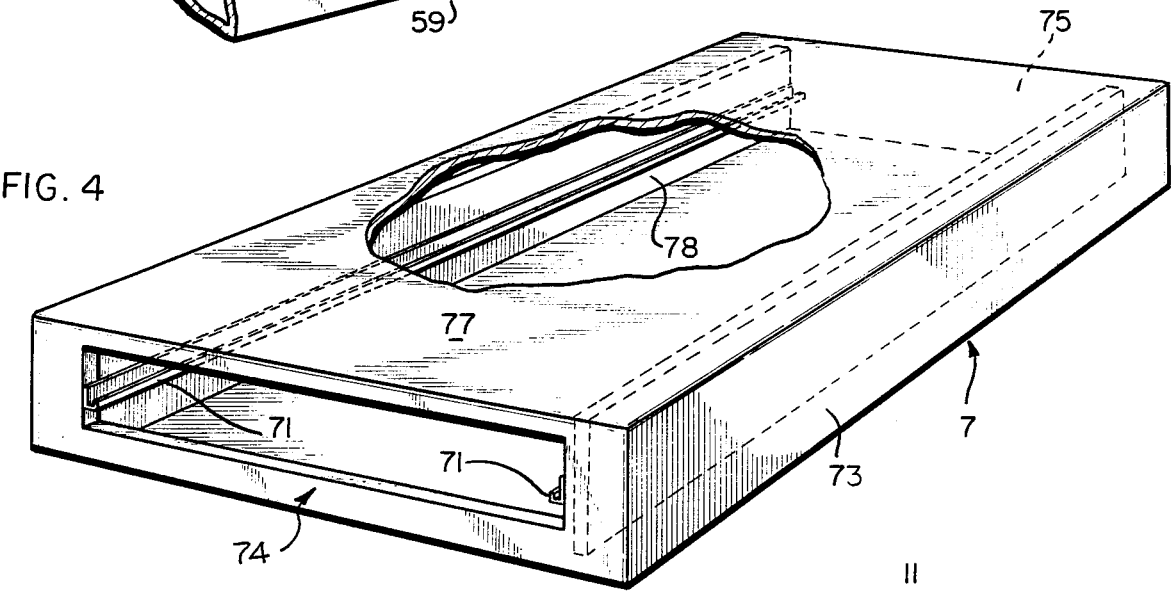
FIG. 4 is a perspective view of structure used for storing the camper of FIGS. 1 and 2.
Figure 5:
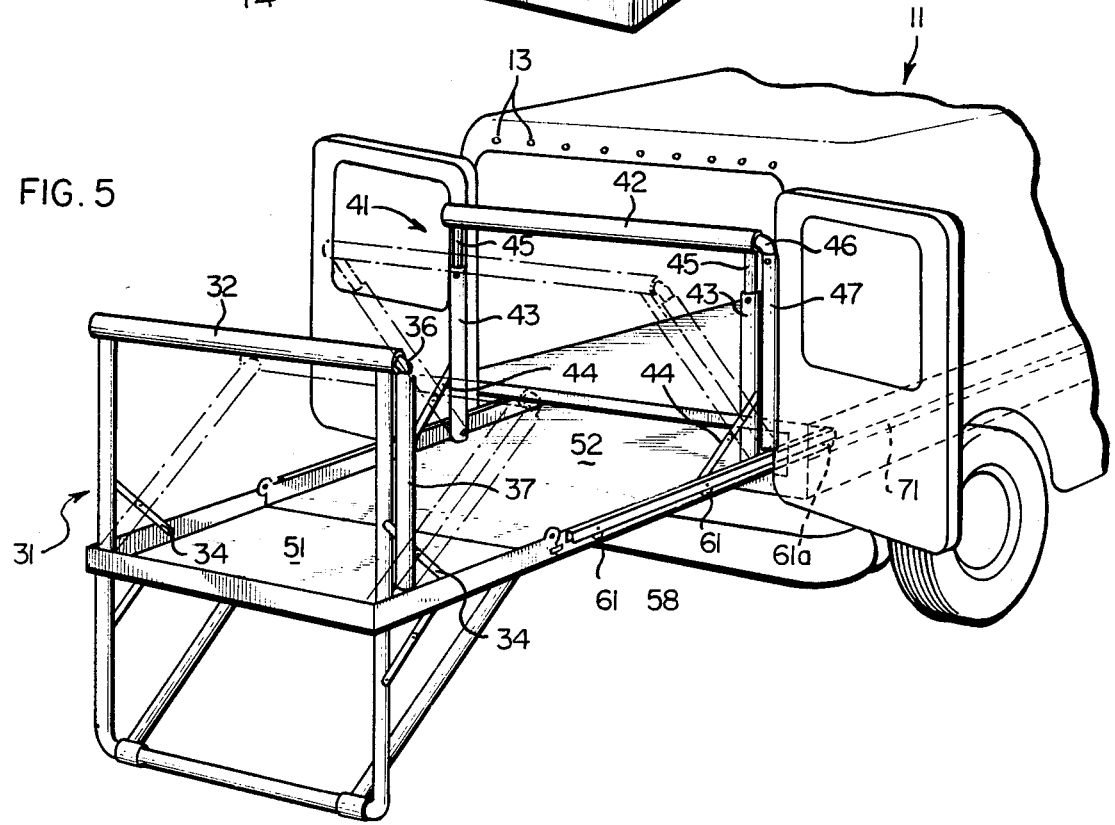
FIG. 5 is a perspective view similar to that of FIG. 2, but showing the camper in an intermediate stage of collapse prior to storage.

FIG. 4 illustrates the box-like storage compartment 7 located in the rear of vehicle 11 adjacent the vehicle floor. The framework for storage compartment 7 includes a pair of laterally opposite outer side panels 73 located adjacent the respective interior sides of the vehicle, a pair of inner side panels 78 located interior of panels 73 and laterally adjacent the rear opening of vehicle 11, a rearward end panel 74 located adjacent the rear of vehicle 11 and having an opening dimensioned to allow the camper to slide into the storage compartment, and an end panel 75 located sufficiently forward of the rear of the vehicle to allow the camper to be stored within the framework. A respective guide rail 71, extending the length of storage compartment 7, is attached to the interior-facing surface of each inner side panel 78. A top panel 77 is attached to the top of the framework to cover the storage compartment and to additionally provide an additional bed or storage platform within the vehicle.

FIGS. 5 and 6 show the camper in intermediate stages of collapse prior to storage, with covering 1 and vehicle 11 substantially removed for the purpose of illustrating the collapsing of frame 3 and bed platform 5. It should be noted, however, that fabric covering 1 need not actually be removed from the frame 5 to facilitate storage. Covering 1 can be folded along with the folding and collapse of frame 5, and can be stored with frame 3 and platform 5 in storage compartment 7.

As illustrated in FIG. 5, the camper is configured for storage by initially collapsing covering support frame portions 31 and 41. First, telescoping vertical members 37 and 47 are released, by pressing the associated flexible projections, to slide upwardly over the respective vertical portions of "L"-shaped members 36 and 46. Next, "L"-shaped members 36 and 46 are released to slide laterally into respective cross-members 32 and 42. Then, telescoping vertical members 45 are released to slide downwardly into associated vertical members 43. Thereafter, scissor struts 34 and 44 are folded to allow vertical members 33 and 43 to pivot towards a horizontal position such that frame portions 31 and 41 rest flat against the upper surfaces of panels 51 and 52, respectively.

As illustrated in FIG. 6, after collapsing frame portions 31 and 41, pins 57 are removed and panels 51 and 53 are pivoted to overlie panel 52. Then, base portion 29 of "U"-shaped strut 27 is released from clamps 30. Next, scissor struts 26 are folded to allow "U"-shaped member 21 to pivot towards a horizontal position such that member 21 rests flat against the bottom surface of panel 53. Thereafter, strut 27 is pivoted to overlie and rest flat against the now upwardly-facing bottom surface of panel 53.

Figure 7:
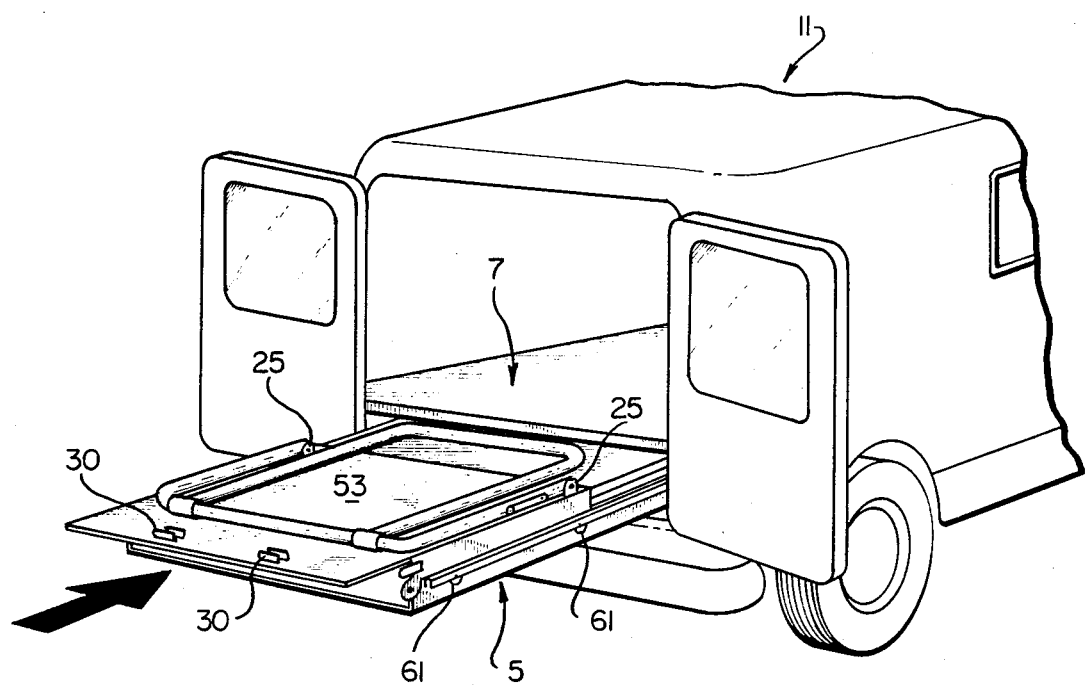
FIG. 7 is a perspective view of the camper as it is being placed into storage.

As illustrated in FIG. 7, now that the camper is in its collapsed configuration, the camper is pushed forward towards vehicle 11. Wheels 61a, and progressively wheels 61, roll on rails 71 as the camper is moved into storage compartment 7 in the rear of the vehicle.

The foregoing detailed description has been given for clearness of understanding only, and no unnecessary limitations should be understood therefrom, as modifications will be obvious to those skilled in the art.

I claim:

1. A collapsible and foldable tent-camper apparatus adapted for use with a rear-opening van-type vehicle having a floor, said camper apparatus comprising:
(1) a fabric covering means;
(2) a foldable platform means, having a rearward end and a forward end, and when unfolded extending rearwardly from the rearward end of said vehicle comprising
    (a) a forward panel and a rearward panel abutting said forward panel, each of said panels having a forward end and a rearward end and laterally opposite sides, and each of said panels extending substantially the width of and parallel to the floor of said vehicle,
    (b) means for hingeably attaching the rearward end of said forward panel to the forward end of said rearward panel, and
    (c) means for attaching the forward end of said forward panel to the rearward end of said vehicle substantially adjacent the upper surface of the floor of said vehicle to support said forward end of said forward panel above the ground; and
(3) a collapsible and foldable frame means, when uncollapsed and unfolded for further supporting said platform means above the ground and for supporting said fabric covering means above and laterally of said platform means comprising
    (a) a first foldable leg means permanently mounted to said rearward panel substantially adjacent the rearward end of said panel for supporting said end of said panel above the ground,
    (b) a second foldable leg means mounted to said platform means intermediate of the forward and rearward ends of said platform means for supporting said platform means intermediate of said ends above the ground,
    (c) a foldable rearward covering support means permanently mounted to said rearward panel substantially adjacent the rearward end of said panel for supporting said fabric covering means above said rearward end of said rearward panel, said rearward covering support means including a laterally disposed rearward cross-member having laterally opposite ends and extending substantially the width of said platform means,
    (d) a telescoping rearward lateral covering support means permanently mounted to and extending laterally out from said rearward covering support means for supporting said fabric covering means above the ground laterally of the rearward end of said rearward panel comprising an "L"-shaped member having a non-detachable lateral telescoping portion slidably attached to one end of said rearward cross-member, and having a substantially vertical downwardly-turned portion formed laterally of said telescoping portion, and further comprising a substantially vertically disposed non-detachable member which is slideably attached to and which telescopes from the downwardly-turned portion of said "L"-shaped member and which extends from said portion to abut the ground,
    (e) a foldable forward covering support means permanently mounted to said forward panel substantially adjacent the forward end of said panel for supporting said fabric covering means above said forward end of said forward panel, said foldable forward covering support means including a laterally disposed forward cross-member having laterally opposite ends and extending substantailly the width of said platform means, and
    (f) a telescoping forward lateral covering support means permanently mounted to and extending laterally out from said forward covering support means for supporting said fabric covering means above the ground laterally of the forward end of said forward panel comprising an "L"-shaped member having a non-detachable lateral telescoping portion slideably attached to one end of said forward cross-member, and having a substantially vertical downwardly-turned portion formed laterally of said telescoping portion, and further comprising a substantially vertically disposed non-detachable member which is slideably attached to and which telescopes from the downwardly-turned portion of said "L"-shape member and which extends from said portion to abut the ground.

2. The apparatus of claim 1 wherein said first foldable leg means comprises:
an upwardly turned "U"-shaped member having a pair of substantially vertically disposed leg portions, each leg portion having an upper and lower end, and a horizontally disposed base portion mounted to the respective lower ends of said leg portions and extending approximately the width of said platform means; and means for permanently hingeably attaching the respective upper ends of said leg portions to said rearward panel substantailly adjacent the respective sides and rearward end of said panel.

3. The apparatus of claim 1 wherein said second foldable leg means comprises:

a downwardly-turned "U"-shaped strut member having a pair of leg portions, each leg portion having an upper and lower end, and a horizontally disposed base portion mounted to the respective upper ends of said leg portions and extending approximately the width of said platform means;

means for releasably attaching said base portion to platform means intermediate of the forward and rearward ends of said platform means; and means for permanently hingeably attaching the respective lower ends of said leg portions to said first foldable leg means substantially adjacent the ground.

4. The apparatus of claim 1 wherein said foldable rearward covering support means comprises:

a pair of substantially vertically disposed members, each of said members having an upper and lower end;

means for permanently hingeably attaching the respective lower ends of said pair of vertical members to said rearward panel means substantially adjacent the sides and rearward end of said rearward panel; and said laterally disposed rearward cross-member permanently attached to the respective upper ends of said pair of vertical members.

5. The apparatus of claim 1 wherein said forward foldable covering support means comprises:

a first pair of vertically disposed members, each of said members having upper and lower ends;

means permanently hingeably attaching the respective lower ends of said first pair of vertical members to said forward panel means substantially adjacent the sides and forward end of said forward panel means;

a second pair of non-detachable vertically disposed members, each of said members having upper and lower ends, which are slideably attached to and which telescope vertically upwardly from the respective upper ends of said first pair of vertical members; and said laterally disposed forward cross-member permanently attached to the respective upper ends of said second pair of vertical members and extending substantially the width of said platform means.

6. The apparatus of claim 1, and further comprising:

(4) a pair of bracket and removable pin means mounted adjacent each side of and adjacent to the abutting ends of said panel means for rigidly connecting said forward panel means to said rearward panel means when said platform means is unfolded.

7. The apparatus of claim 1, and further comprising:

(4) a storage compartment means mounted within said vehicle for storing said fabric covering means, said platform means and said frame means when folded and collapsed.

8. The apparatus of claim 7 wherein:

said storage compartment means is located substantially adjacent the floor of said vehicle.

9. The apparatus of claim 7 wherein said storage compartment means comprises:

means for slideably supporting said forward panel, forward end attaching means.

10. The apparatus of claim 9:

wherein said supporting means comprises a pair of roller wheel tracks located substantially adjacent to the floor and interior sides of said vehicle;

each of said tracks extending substantially parallel to said floor and said interior sides and forward from the rearward end of said vehicle; and wherein said forward panel, forward end attaching means comprises a first pair of roller wheels;

each of said first pair of roller wheels being attached to a respective side of said forward panel means substantially adjacent the forward end of said panel means and resting upon a respective roller wheel track.

11. The apparatus of claim 10, and further comprising:

additional pairs of roller wheels, each of said additional pairs of roller wheels being attached to a respective side of said forward panel means and spaced progressively rearwardly of said first pair of roller wheels.

12. A collapsible and foldable tent-camper apparatus adapted for use with a rear-opening van-type vehicle having a floor, said camper apparatus comprising:

(1) a fabric covering means;

(2) a foldable platform means, having a rearward portion and a forward portion, and when unfolded extending rearwardly from the rearward end of said vehicle comprising (a) means for hingeably attaching the rearward portion of said platform means to the forward portion of said platform means, and (b) means for attaching said forward portion of said platform means to the rearward end of said vehicle to support said forward portion above the ground; and (3) a collapsible and foldable frame means, when uncollapsed and unfolded for further supporting said platform means above the ground for supporting said fabric covering means above and laterally of said platform means comprising (a) foldable leg means permanently mounted to said platform means for supporting said platform means above the ground rearwardly of said vehicle, (b) foldable rearward covering support means permanently mounted to said platform means rearward portion for supporting said fabric covering means above said rearward portion, said rearward covering support means including a laterally disposed rearward cross-member having laterally opposite ends and extending substantially the width of said platform means, (c) telescoping rearward lateral covering support means permanently mounted to and extending laterally out from said rearward covering support means for supporting said fabric covering means above the ground laterally of said rearward portion comprising an "L"-shaped member having a non-detachable lateral telescoping portion slideable attached to one end of said rearward cross-member, and having a substantially vertical downwardly-turned portion formed laterally of said telescoping portion, and further comprising a substantially vertically disposed non-detachable member which is slideably attached to and which telescopes from the downwardly-turned portion of said "L"-shaped member and which extends from said portion to abut the ground,
(d) foldable forward covering support means permanently mounted to said platform means forward portion for supporting said fabric covering means above said forward portion, said foldable forward covering support means including a laterally disposed forward cross-member having laterally opposite ends and extending substantially the width of said platform means, and
(e) telescoping forward lateral covering support means permanently mounted to and extending laterally out from said forward covering support means for supporting said fabric covering means above the ground laterally of said forward portion comprising an "L"-shaped member having a non-detachable lateral telescoping portion slideably attached to one end of said forward cross-member, and having a substantially vertical downwardly-turned portion formed laterally of said telescoping portion, and further comprising a substantially vertically disposed non-detachable member which is slideably attached to and which telescopes from the downwardly-turned portion of said "L"-shaped member and which extends from said portion to abut the ground; and
(4) a storage compartment means mounted within said vehicle for storing said fabric covering means, said platform means, and said frame means when folded and collapsed comprising
  (a) slideable attachment means extending substantially the length of said compartment for slideably attaching said compartment means to said platform means.

* * * * *